US010798307B2

(12) United States Patent
Yamamoto et al.

(10) Patent No.: US 10,798,307 B2
(45) Date of Patent: Oct. 6, 2020

(54) INFORMATION PROCESSING DEVICE, INFORMATION PROCESSING METHOD, AND PROGRAM

(71) Applicant: Sony Semiconductor Solutions Corporation, Kanagawa (JP)

(72) Inventors: Hiroshi Yamamoto, Chiba (JP); Takayoshi Ozone, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/777,444

(22) PCT Filed: Nov. 11, 2016

(86) PCT No.: PCT/JP2016/083478
§ 371 (c)(1),
(2) Date: May 18, 2018

(87) PCT Pub. No.: WO2017/090462
PCT Pub. Date: Jun. 1, 2017

(65) Prior Publication Data
US 2018/0332207 A1 Nov. 15, 2018

(30) Foreign Application Priority Data
Nov. 27, 2015 (JP) .................. 2015-231364

(51) Int. Cl.
*H04N 5/232* (2006.01)
*G06T 7/194* (2017.01)
(Continued)

(52) U.S. Cl.
CPC ............ *H04N 5/2352* (2013.01); *H04M 1/22* (2013.01); *H04N 5/2256* (2013.01);
(Continued)

(58) Field of Classification Search
CPC .. G06T 7/194; G06T 7/20; G06T 1/00; G06T 1/0028; G06T 1/0085; G06T 2207/10052;
(Continued)

(56) References Cited

U.S. PATENT DOCUMENTS

2010/0103268 A1 4/2010 Tokuyama
2010/0259650 A1 10/2010 Sasaki
(Continued)

FOREIGN PATENT DOCUMENTS

JP  2000-101935 A  4/2000
JP  2006-013884 A  1/2006
(Continued)

OTHER PUBLICATIONS

Written Opinion and English translation thereof dated Dec. 27, 2016 in connection with International Application No. PCT/JP2016/083478.
(Continued)

*Primary Examiner* — Dave Czekaj
*Assistant Examiner* — Samuel D Fereja
(74) *Attorney, Agent, or Firm* — Wolf, Greenfield & Sacks, P.C.

(57) ABSTRACT

The present disclosure relates to an information processing device, an information processing method, and a program that enable appropriate imaging with the front camera of a smartphone or the like in the dark.
An LCD backlight that is a white light emitting unit is made to emit intense light as white light, and an infrared light emitting unit that emits infrared light for capturing a live view image is turned off. In such a situation, an imaging unit captures a visible light image. The present disclosure can be applied to imaging devices.

13 Claims, 16 Drawing Sheets

(51) Int. Cl.
| | |
|---|---|
| *H04N 5/235* | (2006.01) |
| *H04M 1/22* | (2006.01) |
| *H04N 5/33* | (2006.01) |
| *H04N 5/225* | (2006.01) |
| *H04N 9/78* | (2006.01) |
| *H04M 1/02* | (2006.01) |
| *H04N 9/04* | (2006.01) |

(52) U.S. Cl.
CPC ........... *H04N 5/2258* (2013.01); *H04N 5/232* (2013.01); *H04N 5/2351* (2013.01); *H04N 5/2354* (2013.01); *H04N 5/23245* (2013.01); *H04N 5/232933* (2018.08); *H04N 5/33* (2013.01); *H04N 9/78* (2013.01); *H04M 1/0264* (2013.01); *H04M 1/0266* (2013.01); *H04N 9/04553* (2018.08)

(58) Field of Classification Search
CPC ........... G06T 3/4038; G06T 5/00; G06T 7/50; G06K 9/2018; G06K 9/00228; G06K 9/00604; G06K 19/06028; G06K 19/0614; G06K 2009/0006; G06K 7/10722; G06K 7/10742; G06K 7/10801; G06K 7/1404; G06K 7/1413; G06K 9/0004; G06K 9/00221; G06K 9/00255; G06K 9/00375; G06K 9/00671; G06K 9/00899; G06K 9/2036; G06K 9/3233; G06K 9/6202; G06K 9/6288; G06K 9/6289; G06K 9/00006; G06K 9/00234; G06K 9/00355; G06K 9/00597; G06K 9/0061; G06K 9/209; G02F 1/135; G02F 2203/11; G02F 1/13318; G02F 1/1336; G02F 2001/13312; G02F 1/13306; G02F 1/133504; G02F 1/133524; G02F 1/133528; G02F 1/133553; G02F 1/13473; G02F 1/157; G02F 2001/133342; G02F 2001/133531; G02F 2001/133626; G02F 2001/1351; G02F 2001/1352; G02F 2201/44; G02F 2203/58; G02F 1/13; G02F 1/13338; G02F 1/133617; G02F 2001/133614; G09G 2360/144; G09G 2370/022; G09G 2370/04; G09G 2370/16; G09G 2370/18; G09G 3/3406; G09G 2320/0606; G09G 2320/0666; G09G 2340/14; G09G 2354/00; G09G 2370/042; G09G 2370/06; G09G 2370/10; G09G 2380/10; G09G 3/001; G09G 3/346; G09G 5/14; G09G 2300/0426; G09G 2310/0235; G09G 2310/024; G09G 2320/0261; G09G 2320/0271; G09G 2320/0613; G09G 2320/0646; G09G 2320/08; G09G 2320/10; G09G 2330/021; G09G 2340/0428; G09G 2340/0492; G09G 2340/12; G09G 2340/125; G09G 2360/142; G09G 2360/145; G09G 2370/20; G09G 3/20; G09G 3/2022; G09G 5/003; G09G 5/026; G09G 5/363
See application file for complete search history.

(56) References Cited

U.S. PATENT DOCUMENTS

| | | | | |
|---|---|---|---|---|
| 2014/0353501 | A1* | 12/2014 | Fantone | G02B 23/12 250/330 |
| 2015/0304638 | A1* | 10/2015 | Cho | G01S 17/89 348/46 |
| 2016/0139039 | A1 | 5/2016 | Ikehara et al. | |
| 2017/0094141 | A1* | 3/2017 | Hicks | H04N 5/2258 |
| 2017/0140221 | A1* | 5/2017 | Ollila | G06K 9/00604 |

FOREIGN PATENT DOCUMENTS

| | | |
|---|---|---|
| JP | 2006-311358 A | 11/2006 |
| JP | 2007-081487 A | 3/2007 |
| JP | 2007-110717 A | 4/2007 |
| JP | 2010-103740 A | 5/2010 |
| JP | 2010-245977 A | 10/2010 |
| JP | 2011-015086 A | 1/2011 |
| JP | 2014-142851 A | 8/2014 |
| WO | WO 2014/192876 A1 | 12/2014 |

OTHER PUBLICATIONS

International Preliminary Report on Patentability and English translation thereof dated Jun. 7, 2018 in connection with International Application No. PCT/JP2016/083478.

International Search Report and English translation thereof dated Dec. 27, 2016 in connection with International Application No. PCT/JP2016/083478.

\* cited by examiner

INFORMATION PROCESSING DEVICE, INFORMATION PROCESSING METHOD, AND PROGRAM

CROSS-REFERENCE TO RELATED APPLICATIONS

This application is a U.S. National Stage entry under 35 U.S.C. § 371 of International Application No. PCT/JP2016/083478, filed in the Japan Patent Office on Nov. 11, 2016, which claims priority to Patent Application No. JP2015-231364, filed in the Japan Patent Office on Nov. 27, 2015, each of which is incorporated by reference herein in its entirety.

TECHNICAL FIELD

The present disclosure relates to an information processing device, an information processing method, and a program, and more particularly, to an information processing device, an information processing method, and a program that enable appropriate imaging with the front camera of a smartphone or the like in the dark.

BACKGROUND ART

A smartphone is equipped with a camera on the back surface and another camera on the front surface on which, for example, a microphone for talking, a speaker, and a display formed with a liquid crystal display (LCD) or the like are provided.

The camera provided on the back surface has relatively high resolution and high sensitivity, and a light or the like might be provided on the back surface. However, the front camera provided on the front surface normally has low precision, and is not equipped with any light or the like. Therefore, an image captured by the front camera is dark. Particularly, it is difficult to see a moving image or a live view (a through-lens image captured before a still image is captured).

In view of this, a technique for making the backlight of an LCD brighter and utilizing the backlight as lighting has been suggested (see Patent Document 1).

A technique for projecting an image of an object brightly by using an auxiliary light formed with a light emitting diode (LED) or the like has also been suggested (see Patent Document 2).

CITATION LIST

Patent Documents

Patent Document 1: Japanese Patent Application Laid-Open No. 2007-110717
Patent Document 2: Japanese Patent Application Laid-Open No. 2007-081487

SUMMARY OF THE INVENTION

Problems to be Solved by the Invention

However, the front camera has no ambient external light, and cannot obtain a sufficient amount of light in the dark. Therefore, there is a possibility that any appropriate image will not be captured.

Also, according to the technology disclosed in Patent Document 1, it is possible to use an LCD backlight instead of lighting. However, it might become difficult to check the angle of view because the lighting by the backlight is too bright.

Further, according to the technology disclosed in Patent Document 2, an auxiliary light for the LED is provided in the vicinity of a display unit. Therefore, the display unit glares in practice, and visibility is not high.

The present disclosure is made in view of such circumstances, and particularly aims to enable appropriate imaging with the front camera of a smartphone or the like in the dark.

Solutions to Problems

An information processing device according to one aspect of the present disclosure is an information processing device that includes: an imaging unit that captures an infrared light image and a visible light image; a white light emitting unit that emits white light; and an infrared light emitting unit that emits infrared light. In the information processing device, when the white light emitting unit emits white light while the infrared light emitting unit does not emit infrared light, the imaging unit captures the visible light image.

The information processing device may further include a combining unit that combines the infrared light image and the visible light image. In the information processing device, when the white light emitting unit emits white light while the infrared light emitting unit does not emit infrared light, the imaging unit may be made to capture the visible light image. When the white light emitting unit does not emit white light or emits weak light while the infrared light emitting unit emits infrared light before or after the imaging unit captures the visible light image, the imaging unit may be made to capture the infrared light image.

The combining unit may be designed to include: a separation unit that separates the visible light image into a luminance signal and a chrominance signal; and an infrared-light chrominance combining unit that combines a pixel signal of the infrared light image with the chrominance signal separated by the separation unit, the pixel signal of the infrared light image being regarded as the luminance signal.

The combining unit may be designed to further include a noise removal unit that removes noise from the visible light image, and the separation unit may be made to separate the visible light image, from which noise has been removed by the noise removal unit, into the luminance signal and the chrominance signal.

The combining unit may be designed to further include a signal level correction unit that corrects the signal level of the pixel signal of the infrared light image, using the luminance signal separated by the separation unit, and the infrared-light chrominance combining unit may be made to combine the pixel signal of the infrared light image having the signal level corrected by the signal level correction unit with the chrominance signal separated by the separation unit, the pixel signal having the corrected signal level being regarded as the luminance signal.

In a case where a still image capturing instruction is issued, when the white light emitting unit emits white light while the infrared light emitting unit does not emit infrared light, the imaging unit may be made to capture the visible light image. When the white light emitting unit does not emit white light or emits weak light while the infrared light emitting unit emits infrared light before or after the imaging unit captures the visible light image, the imaging unit may be made to capture the infrared light image.

In a case where a live view image is to be captured, when the white light emitting unit emits white light while the infrared light emitting unit does not emit infrared light, the imaging unit may be made to capture the visible light image. When the white light emitting unit does not emit white light or emits weak light while the infrared light emitting unit emits infrared light before or after the imaging unit captures the visible light image, the imaging unit may be made to capture the infrared light image.

The white light emitting unit may be a light emitting diode (LED).

The information processing device may be designed to further include a display unit that displays an image captured by the imaging unit, and the white light emitting unit may be the backlight of the display unit.

The imaging unit, the infrared light emitting unit, and the white light emitting unit may be disposed on the same face of a main body.

The imaging unit, the infrared light emitting unit, and the white light emitting unit may be disposed on a surface of the main body.

An information processing method according to one aspect of the present disclosure is an information processing method implemented in an information processing device that includes: an imaging unit that captures an infrared light image and a visible light image; a white light emitting unit that emits white light; and an infrared light emitting unit that emits infrared light. In the information processing device, when the white light emitting unit emits white light while the infrared light emitting unit does not emit infrared light, the imaging unit captures the visible light image.

A program according to one aspect of the present disclosure is a program for causing a computer to function as: an imaging unit that captures an infrared light image and a visible light image; a white light emitting unit that emits white light; and an infrared light emitting unit that emits infrared light. When the white light emitting unit emits white light while the infrared light emitting unit does not emit infrared light, the imaging unit captures the visible light image.

In one aspect of the present disclosure, an infrared light image and a visible light image are captured by the imaging unit, white light is emitted by the white light emitting unit, and infrared light is emitted by the infrared light emitting unit. When white light is emitted by the white light emitting unit while no infrared light is emitted from the infrared light emitting unit, the visible light image is captured by the imaging unit.

Effects of the Invention

According to one aspect of the present disclosure, it is possible to appropriately capture an image with the front camera of a smartphone or the like in the dark.

MODE FOR CARRYING OUT THE INVENTION

Figure 1:
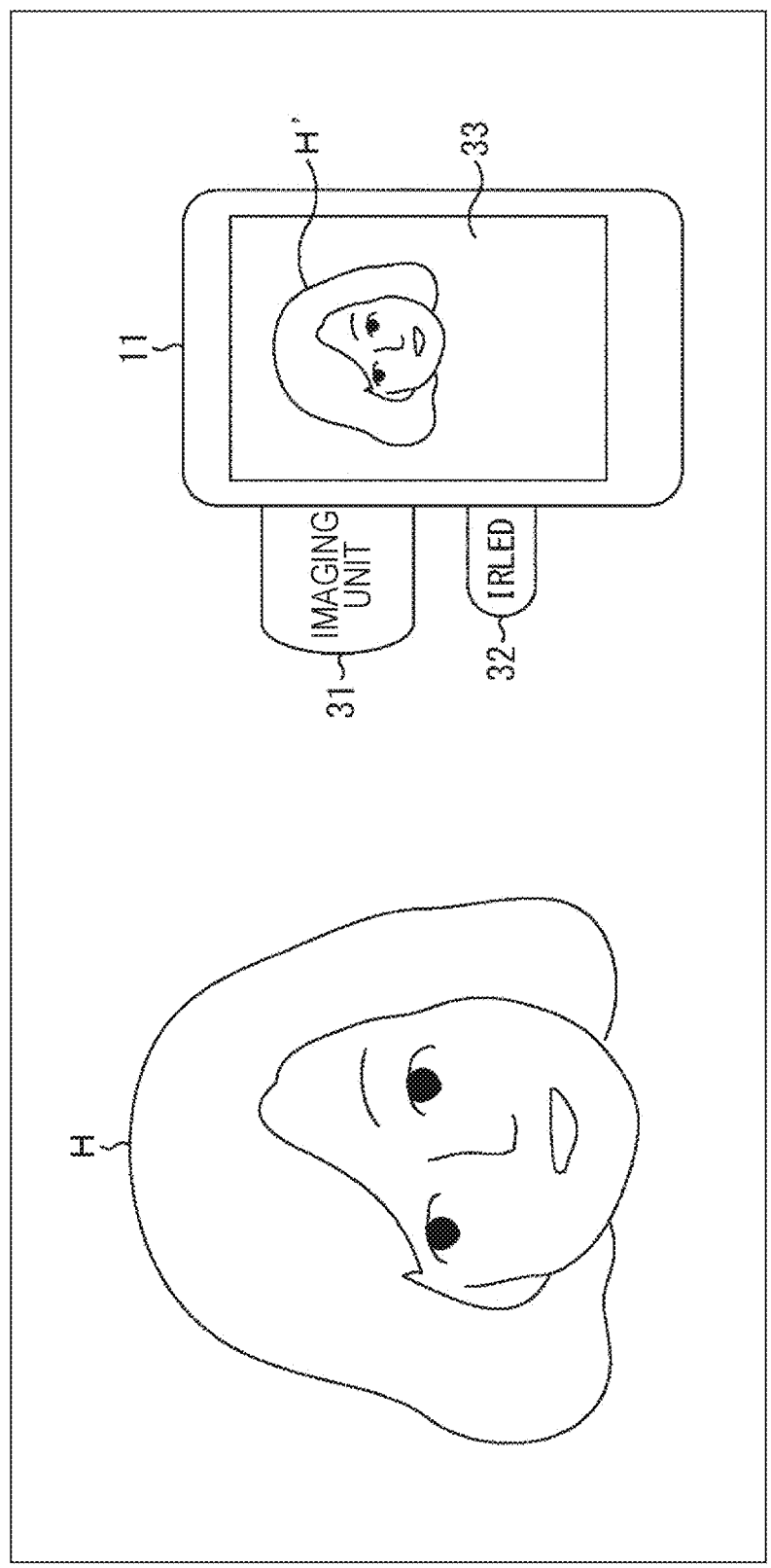
FIG. 1 is an external perspective view for explaining the configuration of a first embodiment of an information processing device according to the present disclosure.

The following is a detailed description of preferred embodiments of the present disclosure, with reference to the accompanying drawings. It should be noted that, in this specification and the drawings, components having substantially the same functional structure are denoted by the same reference numeral, and explanation of them will not be repeated.

1. First Embodiment

External Perspective View of an Information Processing Device According to a First Embodiment FIG. 1 is an external perspective view for explaining an example configuration of a first embodiment of an information processing device according to the present disclosure. The information processing device 11 in FIG. 1 is a smartphone or the like, for example, and includes an imaging unit 31 having a front camera for capturing an image in a direction opposite to the surface equipped with a display unit 33 formed with a touch panel, and an infrared light emitting unit (IRLED) 32 that emits infrared light in the imaging direction of the imaging unit 31 in the dark.

In FIG. 1, a user H holding the information processing device 11 is imaged by the imaging unit 31, and the image captured by the imaging unit 31 is displayed as a user H' on the display unit 33.

To check the imaging angle of view in the dark, the information processing device 11 controls the infrared light emitting unit 32 to emit infrared light that cannot be visually recognized by the user, captures a live view image corresponding to the infrared light, and displays the live view image on the display unit 33.

Here, a live view image is an image displayed on the display unit 33 as an almost moving image with a lower resolution and a lower frame rate than in a normal imaging state, for example. The user checks the angle of view while watching the live view image, and determines the imaging position. Therefore, a live view image is an image intended to be displayed to the user, and is not an image to be recorded on, for example, a recording medium like an image taken by operating the shutter.

Then, when the shutter formed with an operation input unit 33a (FIG. 2) is operated, the information processing device 11 reduces light emission from the infrared light emitting unit 32 (or turns off the infrared light emitting unit 32), and causes the backlight of the display unit 33 to emit light. At the same time, the information processing device 11 captures the image at the moment. Then, when the capturing of the image is finished, the information processing device 11 turns off the backlight of the display unit 33, and causes the infrared light emitting unit 32 to project infrared light. By doing so, the information processing device 11 captures a live view image, and causes the display unit 33 to display the live view image.

That is, when an image is captured with the front camera, the information processing device 11 shown in FIG. 1 displays a live view image formed with a glare-free image based on infrared light until the angle of view is determined. After the angle of view is determined, and the shutter is operated, the information processing device 11 causes the backlight of the display unit 33 to emit light like a strobe light, to capture an image.

Through such an operation, the information processing device 11 can appropriately determine the angle of view before capturing an image with the front camera in the dark such as during night-time. Further, when capturing an image, the information processing device 11 can capture the image as a color image by causing the backlight of the display unit 33 to emit light.

Figure 2:
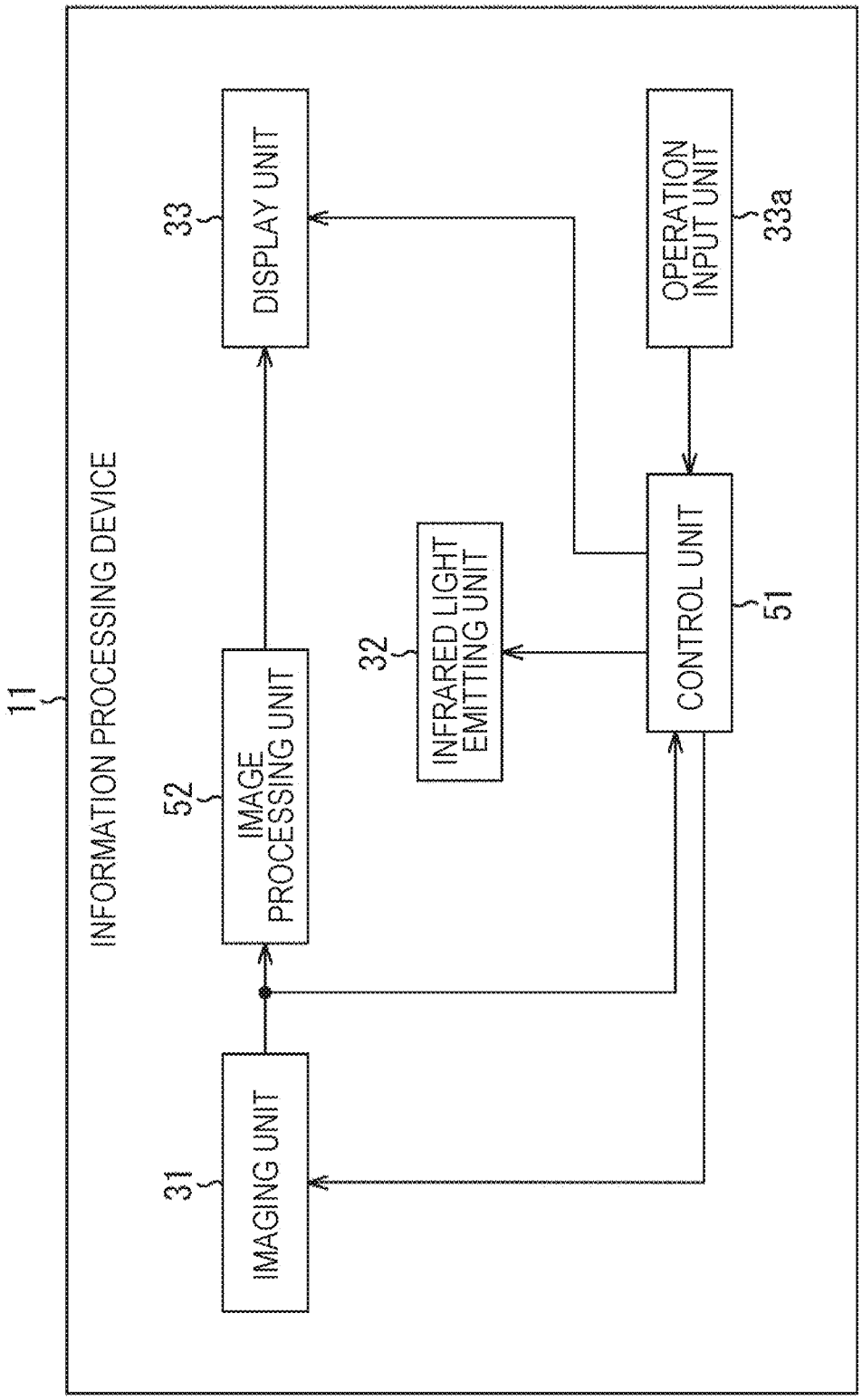
FIG. 2 is a block diagram for explaining an example configuration of the first embodiment of the information processing device shown in FIG. 1.

Example Configuration of the First Embodiment of the Information Processing Device Referring now to the block diagram shown in FIG. 2, a specific example configuration of the first embodiment of the information processing device 11 shown in FIG. 1 is described.

The information processing device 11 includes the imaging unit 31, the infrared light emitting unit (IRLED) 32, the display unit 33, the operation input unit 33a, a control unit 51, and an image processing unit 52.

The control unit 51 is formed with a computer that includes a central processing unit (CPU), a random access memory (RAM), a read only memory (ROM), and the like, and controls the overall operation of the information processing device 11.

The imaging unit 31 is formed with a complementary metal oxide semiconductor (CMOS) image sensor or the like. Under the control of the control unit 51, the imaging unit 31 captures an image, and supplies the Raw data of the captured image to the image processing unit 52. In addition to visible light such as RGB, the imaging unit 31 can capture images corresponding to invisible light such as infrared light (IR) emitted from the infrared light emitting unit 32, for example.

The image processing unit 52 generates an image by performing a series of processes such as mosaicing on the Raw data, and causes the display unit 33 such as a liquid crystal display (LCD) to display the image.

The display unit 33 is formed with a touch panel or the like, and causes a GUI that operates a shutter button to function as the operation input unit 33a, for example, by displaying various kinds of graphical user interface (GUI) images on its surface. When the GUI is operated, a pressing operation on the shutter button is detected. The display unit 33 is also controlled by the control unit 51 at a time when the shutter button is operated to capture an image, and causes the backlight formed with a light emitting diode (LED) or the like to emit light such as white light. In this manner, the display unit 33 also functions as a strobe light.

The infrared light emitting unit 32 emits auxiliary light that is infrared light (IR) having a wavelength of, for example, approximately 0.7 μm to 1 mm (=1000 μm), which is imageable in the imaging unit 31, belonging to a range of so-called near-infrared light, mid-infrared light, or far-infrared light It should be noted that, in the information processing device 11 formed with a smartphone or the like, an imaging unit that has higher resolution and higher sensitivity than the imaging unit 31 as the front camera is provided on a back surface portion not shown in the drawing, but is not explained herein.

Imaging Process to Be Performed by the Information Processing Device in FIG. 2

Figure 3:
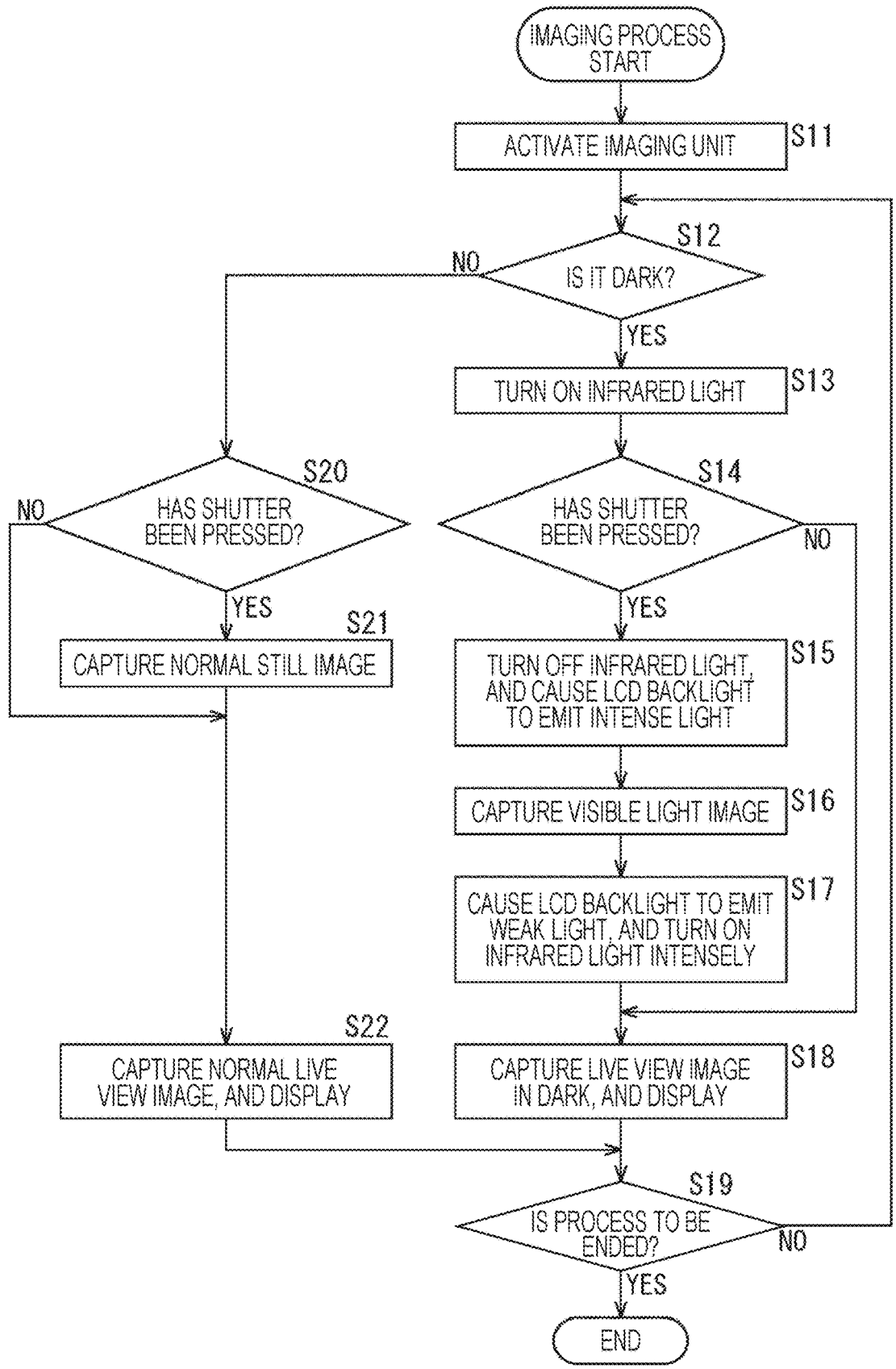
FIG. 3 is a flowchart for explaining an imaging process to be performed by the information processing device shown in FIG. 2.

Referring now to the flowchart shown in FIG. 3, an imaging process to be performed by the information processing device 11 shown in FIG. 1 is described. It should be noted that the imaging process described herein is an imaging process to be performed when the imaging unit 31 formed with the front camera is used, for example, not an imaging process to be performed by the imaging unit provided on a back surface portion (not shown).

In step S11, the control unit 51 activates the imaging unit 31 so that images can be captured. As a result, the imaging unit 31 sequentially supplies captured images to the control unit 51 and the image processing unit 52.

In step S12, the control unit 51 determines whether an image is a dark image having a lower illuminance than a predetermined illuminance, in accordance with an image captured by the imaging unit 31. If the captured image is determined not to have a lower illuminance than the predetermined illuminance and is regarded as an image with normal brightness in step S12, the process moves on to step S20.

In step S20, the control unit 51 determines whether the operation input unit 33a, which functions as the shutter button, has been displayed as a GUI image beforehand on the display unit 33, and an imaging instruction has been issued by operating the operation input unit 33a.

If it is determined in step S20 that the operation input unit 33a has been operated and an imaging instruction has been issued, the process moves on to step S21.

In step S21, the control unit 51 controls the imaging unit 31 to capture a normal still image, and stores the image data subjected to predetermined processing at the image processing unit 52 into a recording medium or the like (not shown). The process then moves on to step S22. Capturing a normal still image is extracting a visible light image from an image captured by the imaging unit 31. If it is determined in step S20 that the operation input unit 33a has not been operated, however, the processing in step S20 is skipped.

In step S22, the control unit 51 controls the imaging unit 31 to capture a normal live view image, and supplies the live view image to the image processing unit 52. The image processing unit 52 performs predetermined image processing, and causes the display unit 33 to display the resultant image as a live view image. Here, capturing and displaying a normal live view image means extracting visible light images from relatively low resolution images captured at predetermined time intervals by the imaging unit 31, and displaying these images as a moving image with a relatively low frame rate.

In step S19, the control unit 51 determines whether the operation input unit 33a has been operated, and an imaging process end instruction has been issued. If any end instruction has not been issued, the process returns to step S12. Then, if an end instruction has been issued in step S19, the process comes to an end.

If it is determined in step S12 that the captured image has a lower illuminance than the predetermined illuminance and is dark, on the other hand, the process moves on to step S13.

In step S13, the control unit 51 controls the infrared light emitting unit 32 to emit infrared light. At this stage, the infrared light emitting unit 32 emits infrared light as light with relatively high intensity.

In step S14, the control unit 51 determines whether the operation input unit 33a, which functions as the shutter button, has been displayed as a GUI image beforehand on the display unit 33, and the operation input unit 33a has been operated.

If it is determined in step S14 that the operation input unit 33a has been operated and an imaging instruction has been issued, the process moves on to step S15.

In step S15, the control unit 51 controls the infrared light emitting unit 32 to turn off, and further causes the backlight of the display unit 33 to emit intense light.

In step S16, the control unit 51 controls the imaging unit 31 to capture a visible light image, and stores the image data subjected to predetermined processing at the image processing unit 52 into a recording medium or the like (not shown). The process then moves on to step S17.

In step S17, the control unit 51 causes the backlight of the display unit 33 to emit weak light, or sets the backlight of the display unit 33 at such an intensity as to display a normal live view image. The control unit 51 also controls the infrared light emitting unit 32 to emit infrared light. The process then moves on to step S18.

If it is determined in step S14 that the operation input unit 33a has not been operated, on the other hand, the process moves on to step S18.

In step S18, the control unit 51 controls the imaging unit 31 to capture a live view image in the dark, and supplies the live view image to the image processing unit 52. The image processing unit 52 performs predetermined image processing, and causes the display unit 33 to display the resultant image as a live view image in the dark. The process then moves on to step S19. Here, capturing and displaying a live view image in the dark means extracting visible light images and infrared light images having relatively low resolutions from images captured at predetermined time intervals, extracting chrominance images from the visible light images, combine the chrominance images with the infrared light images as luminance images, and displaying the resultant images as a color image with a relatively low frame rate.

Figure 4:
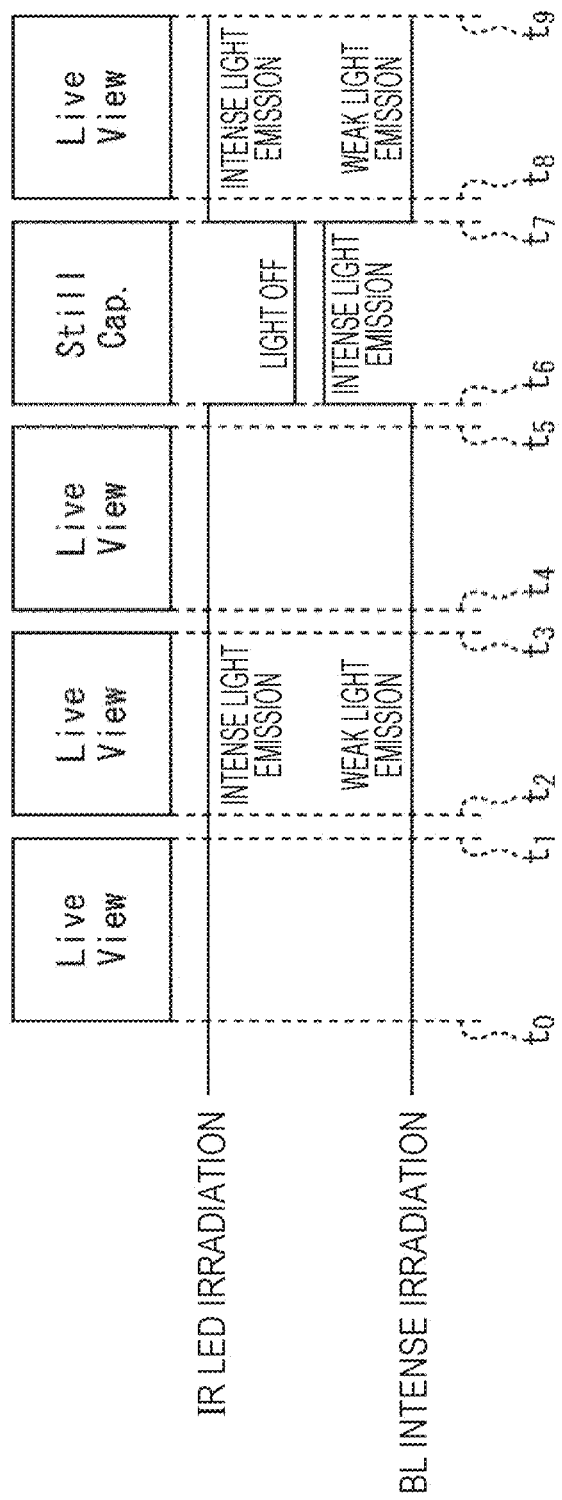
FIG. 4 is a diagram for explaining the imaging process to be performed by the information processing device shown in FIG. 2.

Through the above process, the processing shown in FIG. 4 is performed, for example. It should be noted that, in FIG. 4, the top row shows the image types (Live View: live view image capturing, Still Cap.: still image capturing) of the respective frames to be captured, the middle row shows the operating states of the infrared light emitting unit 32, and the bottom row shows the light emitting states of the backlight of the display unit 33.

That is, in a case where an image is regarded as dark after the imaging unit 31 is activated, the processes in steps S12 through S14, S18, and S19 are repeated until the shutter is pressed. As indicated by times t0 through t5, a live view image is captured, the infrared light emitting unit 32 emits infrared light, the backlight of the display unit 33 emits weak light, and the display unit 33 continuously displays a live view image during the period from time t0 to time t1, the period from time t2 to time t3, and the period from time t4 to time t5.

If the operation input unit 33a is operated at this point, and the shutter button is determined to have been operated, the series of processes in steps S15 through S17 are performed, so that a still image is captured by the imaging unit 31, the infrared light emitting unit 32 is turned off, and the backlight of the display unit 33 emits intense light during the period from time t6 to time t7.

As a result, the backlight of the display unit 33 emits light like a strobe light only when the operation input unit 33a serving as the shutter button is operated. Thus, the imaging unit 31 can capture a color image with normal brightness. Further, the backlight of the display unit 33 emits light like a strobe light only at the moment the shutter button is pressed. Accordingly, when a live view image is to be displayed, a live view image is captured with infrared light that does not glare on the display unit 33 and has relatively high intensity. Thus, a clear live view image can be captured and displayed, and an appropriate angle of view can be set.

It should be noted that, in the example described above, an infrared light image is captured after a visible light image is captured. However, a visible light image may be captured after an infrared light image is captured.

2. Second Embodiment

External Perspective View of an Information Processing Device According to a Second Embodiment In the example described above, every time a still image is captured, the backlight of the display unit 33 is made to emit intense light and function as a strobe light. However, a white light emitting unit formed with a white LED that is equivalent to the strobe light may also be prepared, and be made to function like the backlight of the display unit 33 described above.

Figure 5:
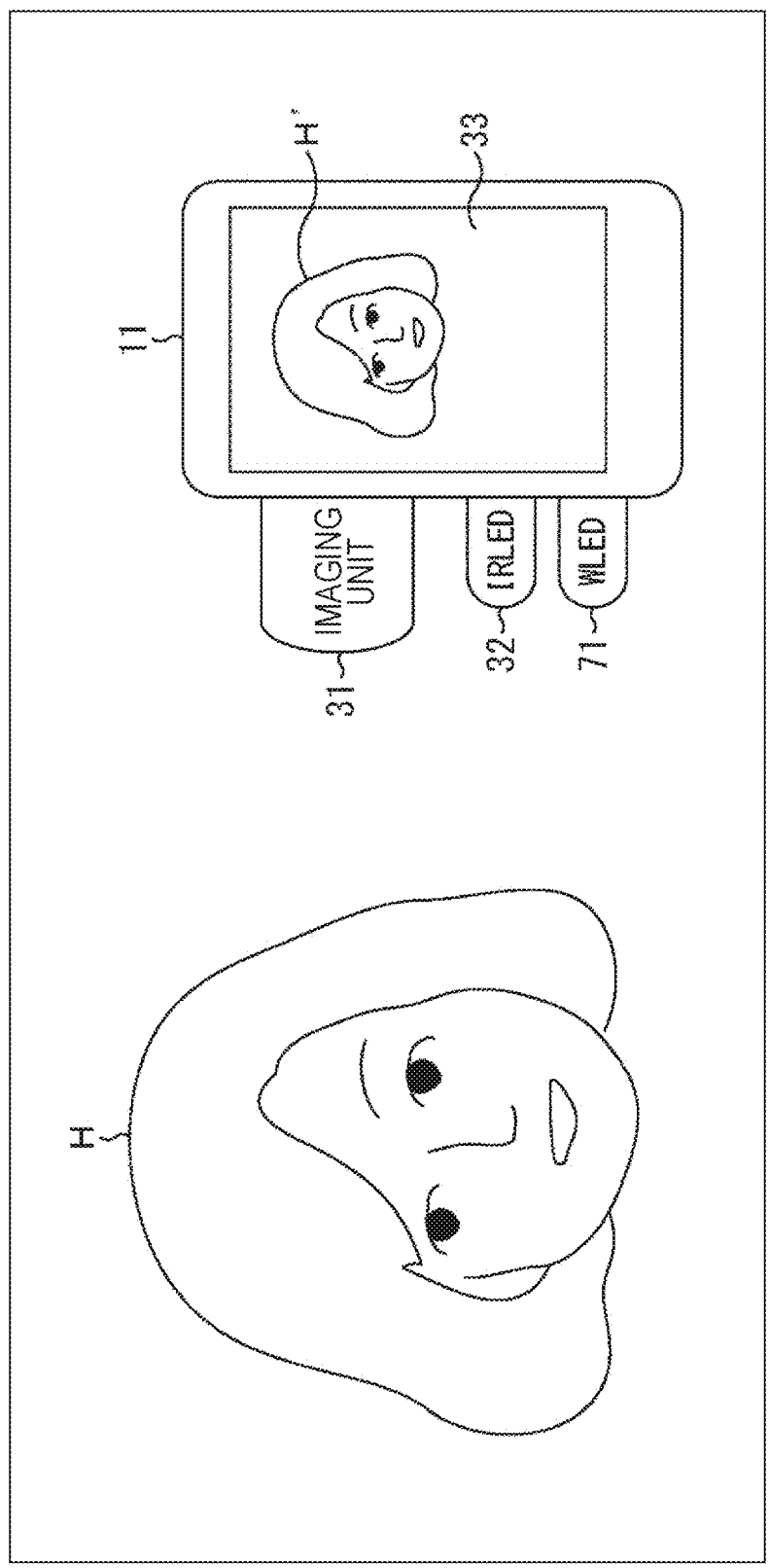
FIG. 5 is an external perspective view for explaining the configuration of a second embodiment of an information processing device according to the present disclosure.

FIG. 5 shows an example configuration of a second embodiment of an information processing device 11 in which a white light emitting unit formed with a white LED that is equivalent to the strobe light is also provided.

That is, FIG. 5 shows an example configuration of an information processing device 11 that includes a white light emitting unit (WLED) 71 formed with an LED that emits white light in the direction toward the surface on which the display unit 33 is provided, as well as the infrared light emitting unit 32.

In such a configuration, when the operation input unit 33a functioning as the shutter button is operated, the white light emitting unit (WLED) 71 as a strobe light is made to emit light, so that a color image with appropriate brightness can be captured.

Figure 6:
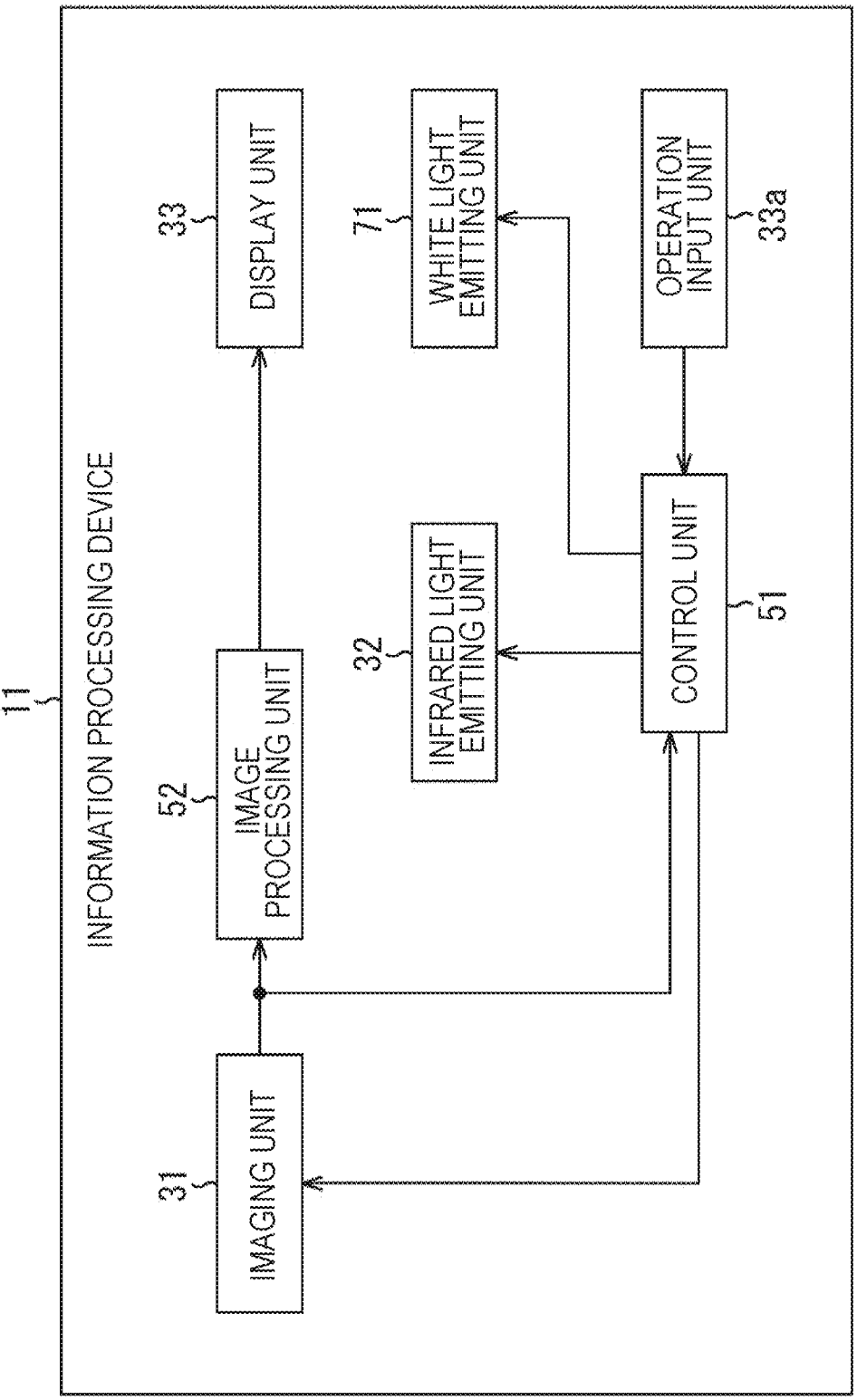
FIG. 6 is a block diagram for explaining an example configuration of the second embodiment of the information processing device shown in FIG. 5.

Example Configuration of the Second Embodiment of the Information Processing Device Referring now to the block diagram shown in FIG. 6, a specific example configuration of the second embodiment of the information processing device 11 shown in FIG. 5 is described. It should be noted that, in the information processing device 11 shown in FIG. 6, components having the same functions as those of the information processing device 11 shown in FIG. 2 have the same names and the same reference numerals as those in FIG. 2, and explanation of them will not be made below.

That is, the information processing device 11 shown in FIG. 6 differs from the information processing device 11 shown in FIG. 2 in that the white light emitting unit 71 is added.

The white light emitting unit 71 is formed with an LED, for example, and is controlled by the control unit 51, to emit white light and function as a strobe light.

Imaging Process to Be Performed by the Information Processing Device in FIG. 6

Figure 7:
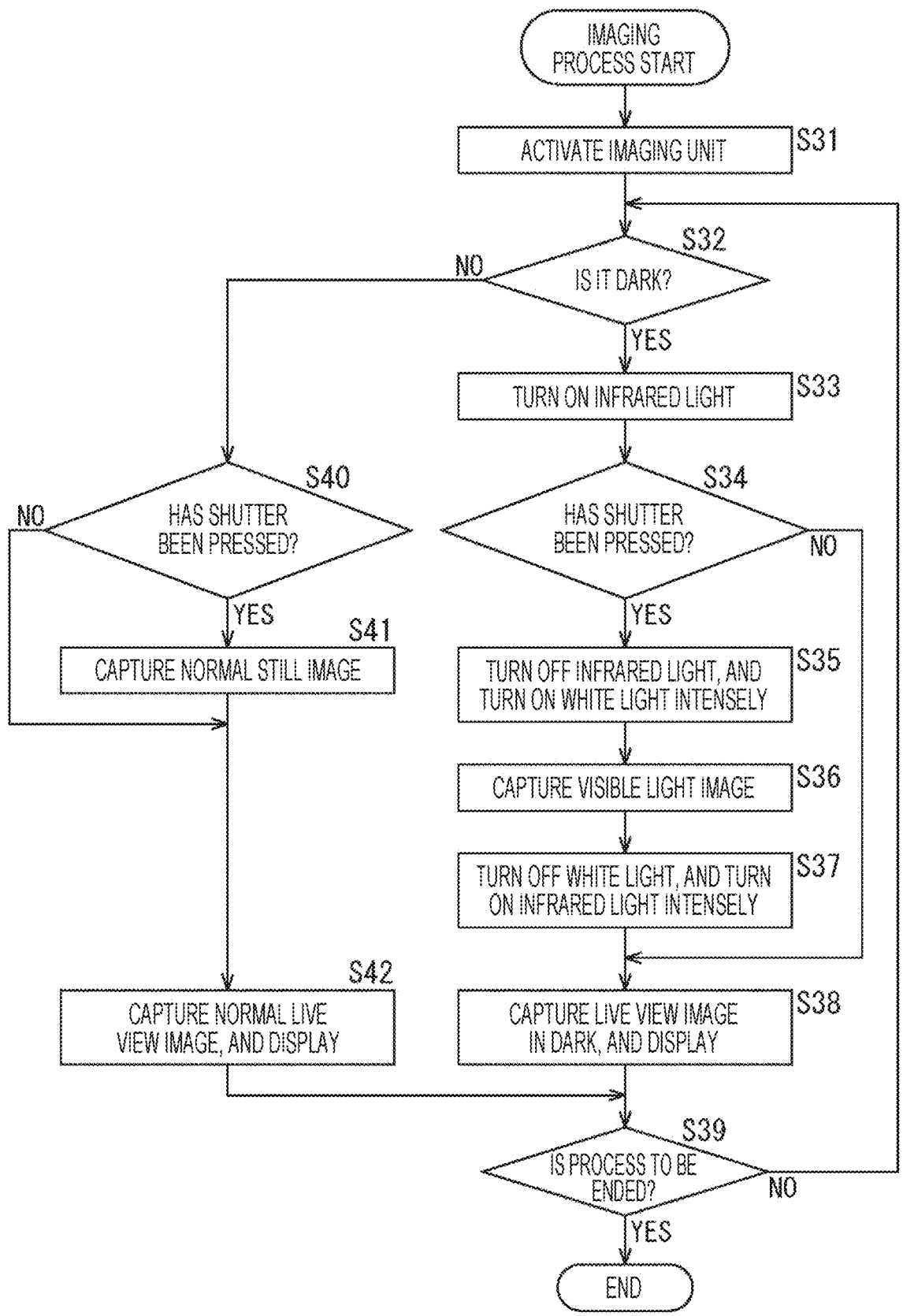
FIG. 7 is a flowchart for explaining an imaging process to be performed by the information processing device shown in FIG. 6.

Referring now to the flowchart shown in FIG. 7, an imaging process to be performed by the information processing device 11 shown in FIG. 6 is described. It should be noted that, of the processing in steps S31 through S42 in the flowchart shown in FIG. 7, the processing except for steps S35 and S37 is similar to the processing in steps S11 through S22 in FIG. 3 except for steps S15 and S17, and therefore, explanation thereof is not repeated herein.

Specifically, in step S35, the control unit 51 controls the infrared light emitting unit 32 to turn off, and further causes the white light emitting unit 71 to emit intense light.

Then, after an image is captured in step S36, the control unit 51 in step S37 turns off the white light emitting unit 71, and controls the infrared light emitting unit 32 to emit infrared light.

Through the above process, effects similar to those of the above information processing device 11 shown in FIG. 2 can be achieved in imaging performed in the dark with the imaging unit 31 formed with a front camera.

3. Third Embodiment

Example Configuration of an Information Processing Device of a Third Embodiment

In an example described above, the backlight of the display unit 33 is made to emit intense light like a strobe light only at a time of imaging, so that white light is emitted, and an image can be appropriately captured. In the dark, however, noise easily appears even in a situation where white light is emitted. To counter this, an infrared light image captured with infrared light may be used as a luminance signal, and be combined with a chrominance signal that is a visible light image in which noise easily appears. In this manner, a high-quality image can be captured even in the dark.

Figure 8:
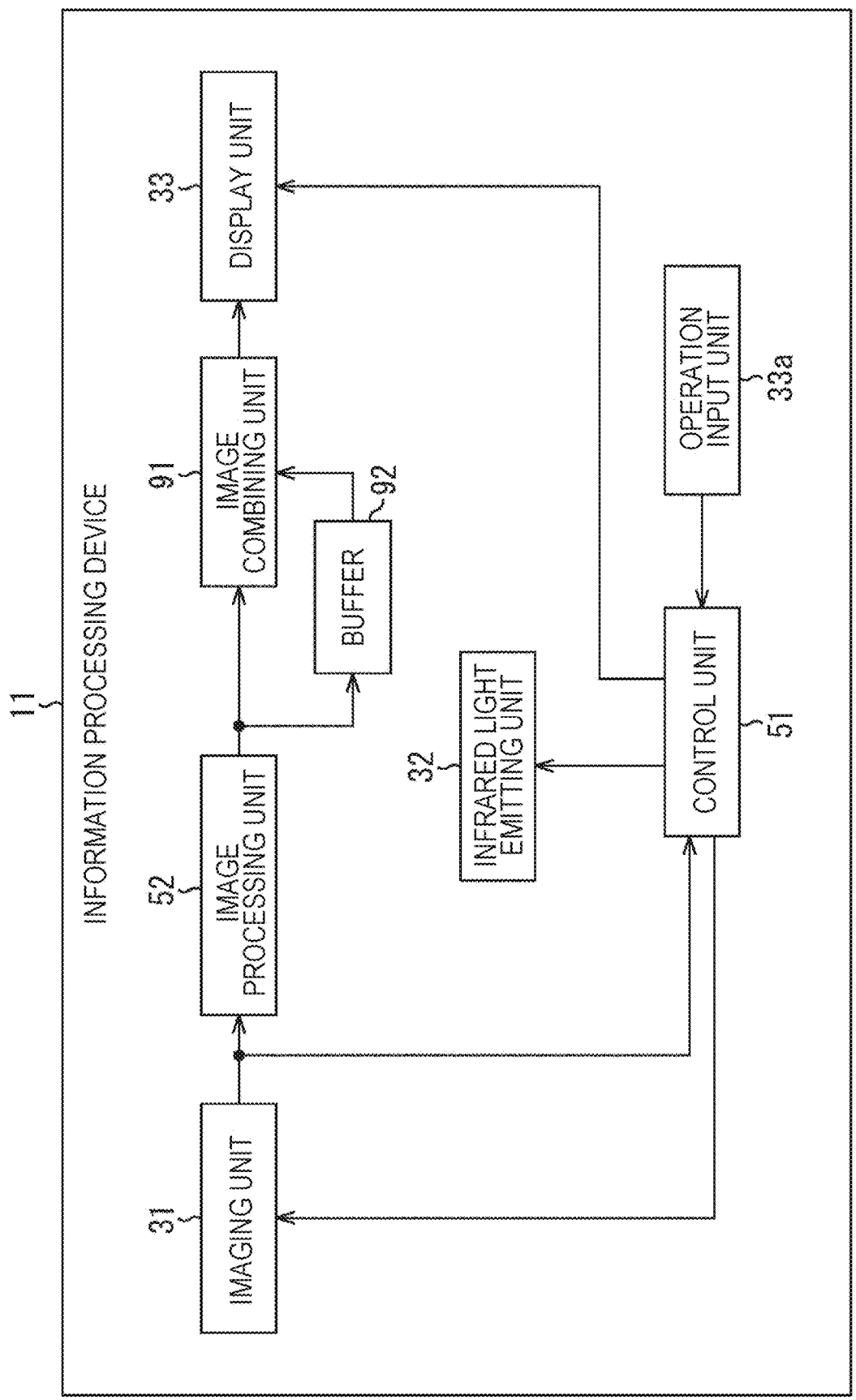
FIG. 8 is a block diagram for explaining an example configuration of a third embodiment of an information processing device.

FIG. 8 shows an example configuration of an information processing device 11 designed to be capable of capturing a high-quality image by using an infrared light image and a visible light image. It should be noted that, in the information processing device 11 shown in FIG. 8, components having the same functions as those of the information processing device 11 shown in FIG. 2 have the same names and the same reference numerals as those in FIG. 2, and explanation of them will not be made below.

Specifically, the information processing device 11 shown in FIG. 8 differs from the information processing device 11 shown in FIG. 1 in that an image combining unit 91 and a buffer 92 are further provided between the image processing unit 52 and the display unit 33.

The image combining unit 91 combines an infrared light image captured when infrared light is being emitted from the infrared light emitting unit 32, with an image (a visible light image) captured when the backlight of the display unit 33 is emitting intense light like a strobe light. At this stage, one of the images, whichever has been captured first, is buffered by the buffer 92. The image combining unit 91 combines the infrared light image and the visible light image that have different conditions.

Example Configuration of the Image Combining Unit

Figure 9:
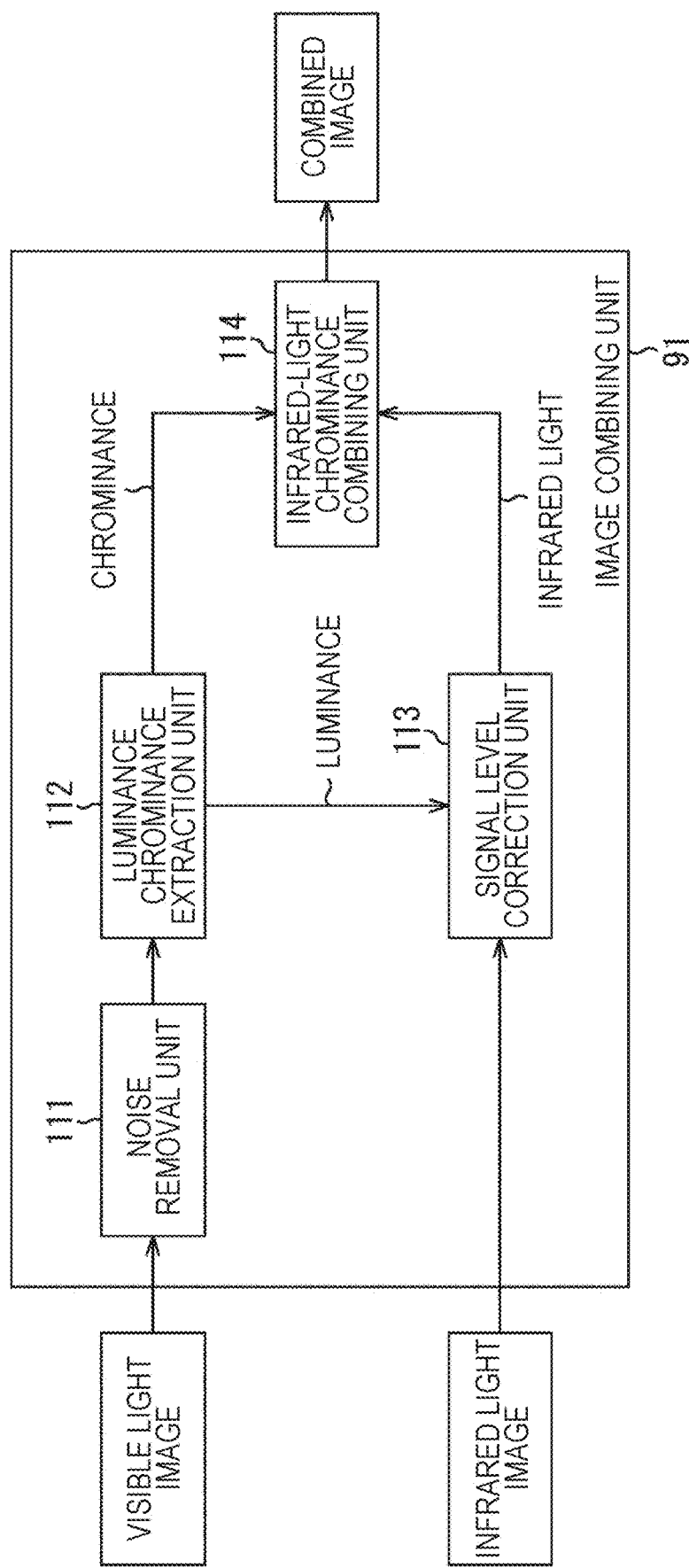
FIG. 9 is a block diagram for explaining an example configuration of the image combining unit shown in FIG. 8.

Referring now to the block diagram shown in FIG. 9, an example configuration of the image combining unit 91 is described.

The image combining unit 91 includes a noise removal unit 111, a luminance chrominance extraction unit 112, a signal level correction unit 113, and an infrared-light chrominance combining unit 114.

The noise removal unit 111 removes noise by using a filter having a relatively large number of taps for a visible light image (a filter using many pixels to be referred to for the target pixel).

The luminance chrominance extraction unit 112 converts a visible light image formed with a noise-removed RGB signal into a YUV luminance signal and a chrominance signal, supplies the luminance signal to the signal level correction unit 113, and supplies the chrominance signal to the infrared-light chrominance combining unit 114.

The signal level correction unit 113 corrects the signal level of an infrared light image having a high signal-to-noise ratio (SNR) with the signal level of the luminance signal of the visible light image, and supplies the result to the infrared-light chrominance combining unit 114.

The infrared-light chrominance combining unit 114 combines a luminance signal that is the signal level of the infrared light image having the signal level corrected, with the chrominance signal of the visible light image, and outputs the resultant image as a color image.

Imaging Process to Be Performed by the Information Processing Device in FIG. 8

Figure 10:
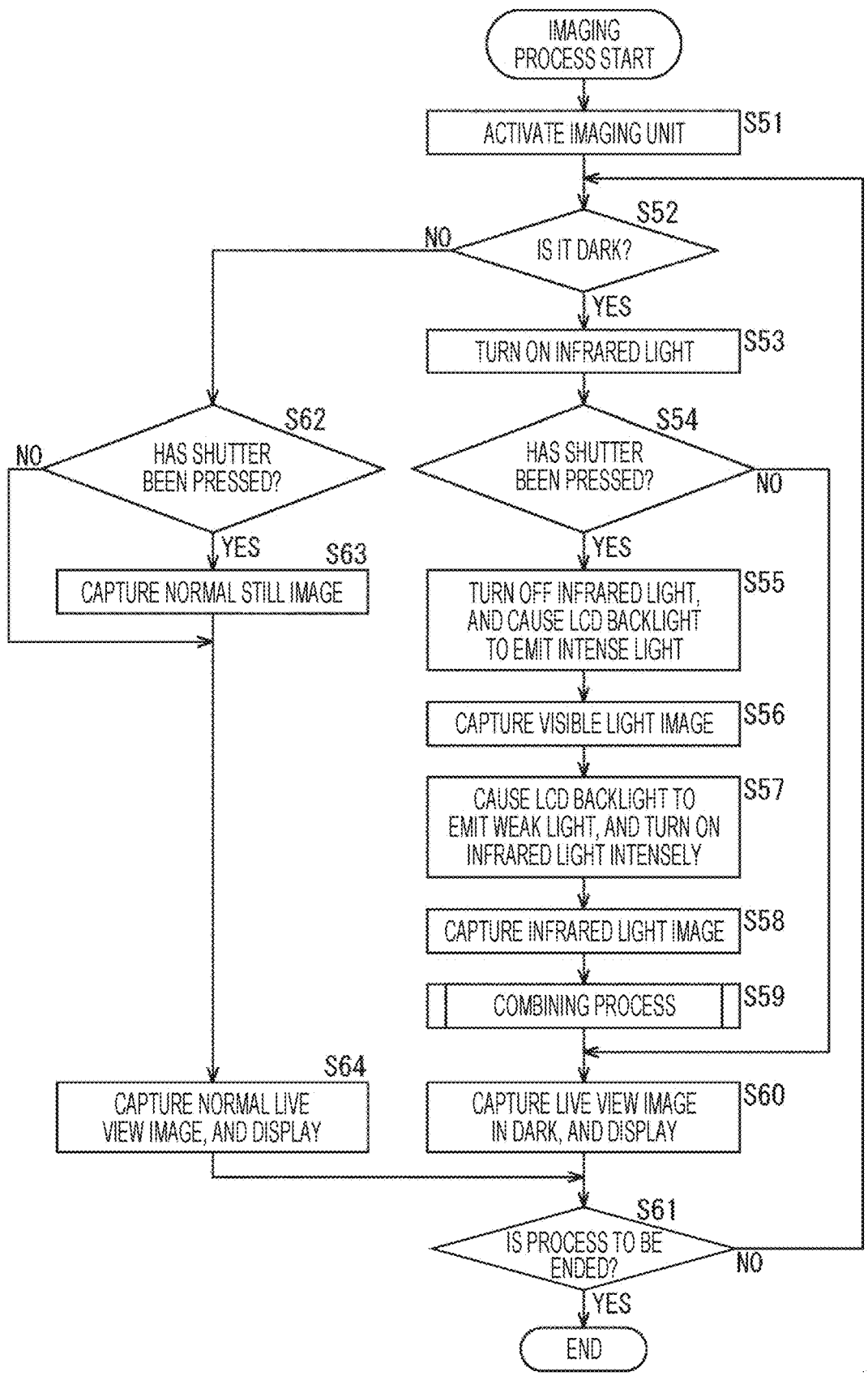
FIG. 10 is a flowchart for explaining an imaging process to be performed by the information processing device shown in FIG. 8.

Referring now to the flowchart shown in FIG. 10, an imaging process to be performed by the information processing device 11 shown in FIG. 8 is described. The processing in steps S51, S52, and S60 through S64 in the flowchart shown in FIG. 10 is similar to the processing in steps S11, S12, and S18 through S22 the flowchart shown in FIG. 3, and therefore, explanation thereof is not repeated herein.

Specifically, if it is determined in step S52 that the captured image has a lower illuminance than the predetermined illuminance and is dark, the process moves on to step S53.

In step S53, the control unit 51 controls the infrared light emitting unit 32 to emit infrared light. At this stage, the infrared light emitting unit 32 emits infrared light as light with relatively high intensity.

In step S54, the control unit 51 determines whether the operation input unit 33a, which functions as the shutter button, has been displayed as a GUI image beforehand on the display unit 33, and the operation input unit 33a has been operated.

If it is determined in step S54 that the operation input unit 33a has been operated and an imaging instruction has been issued, the process moves on to step S55.

In step S55, the control unit 51 controls the infrared light emitting unit 32 to turn off, and further causes the backlight of the display unit 33 to emit intense light.

In step S56, the control unit 51 controls the imaging unit 31 to capture a still image and extract a visible light image from the captured still image, and stores the image data subjected to predetermined processing at the image processing unit 52 into the buffer 92. The process then moves on to step S57.

In step S57, the control unit 51 causes the backlight of the display unit 33 to emit weak light, or sets the backlight of the display unit 33 at such an intensity as to display a normal live view image. The control unit 51 also controls the infrared light emitting unit 32 to emit infrared light. The process then moves on to step S58.

In step S58, the control unit 51 controls the imaging unit 31 to capture a still image and extract an infrared light image from the captured still image, and supplies the infrared light image to the image combining unit 91. The process then moves on to step S59.

In step S59, the image combining unit 91 performs a combining process, to combine the supplied visible light image as still image color information with the infrared light image stored as still image luminance information in the buffer 92.

Combining Process

Figure 11:
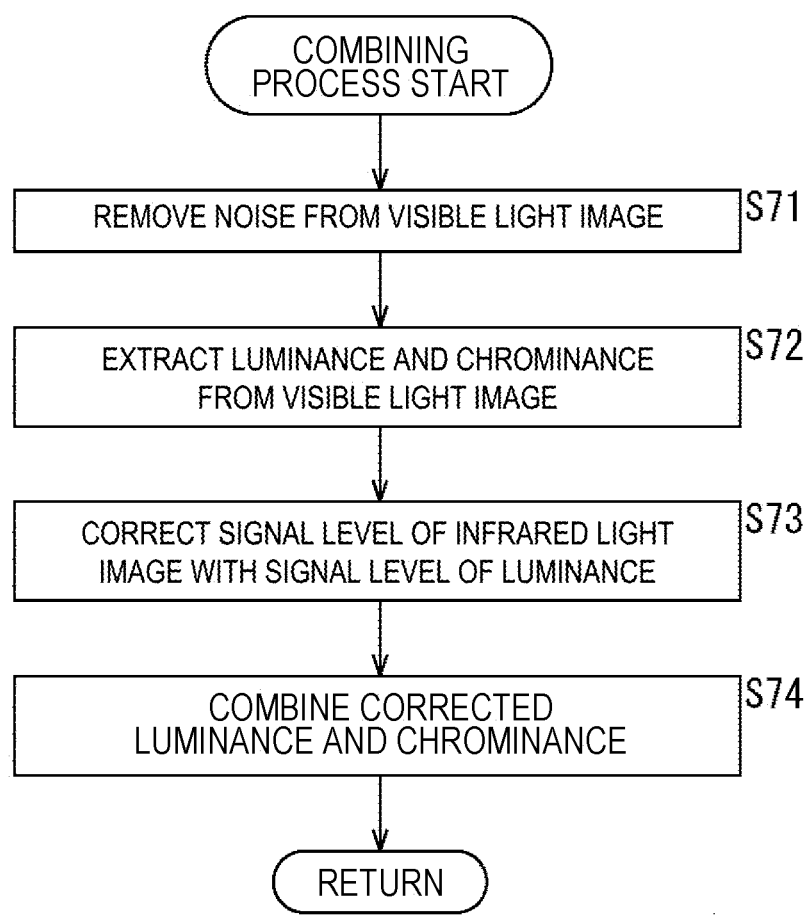
FIG. 11 is a flowchart for explaining the combining process shown in FIG. 10.

Referring now to the flowchart shown in FIG. 11, the combining process is described.

In step S71, the noise removal unit 111 removes noise by using a filter having a relatively large number of taps for the visible light image (a filter using many pixels to be referred to for the target pixel), and supplies the resultant image to the luminance chrominance extraction unit 112. That is, a noise removal process is performed in advance, because, in the dark, noise easily appears in an image generated with the use of the backlight of the display unit 33.

In step S72, the luminance chrominance extraction unit 112 converts a visible light image formed with a noise-removed RGB signal into a YUV luminance signal and a chrominance signal, supplies the luminance signal to the signal level correction unit 113, and supplies the chrominance signal to the infrared-light chrominance combining unit 114.

In step S73, the signal level correction unit 113 corrects the signal level of an infrared light image having a high signal-to-noise ratio (SNR) with the signal level of the luminance signal of the visible light image, and supplies the result to the infrared-light chrominance combining unit 114.

In step S74, the infrared-light chrominance combining unit 114 combines a luminance signal that is the signal level of the infrared light image having the signal level corrected, with the chrominance signal of the visible light image. After that, the infrared-light chrominance combining unit 114 converts the combined signal into an RGB signal, and outputs the RGB signal as a color image.

That is, in the combining process, chrominance information is extracted from a visible light image in which noise relatively easily appears in the dark, and the signal level of an infrared light image having a relatively high SNR in the dark is extracted as a luminance signal. The chrominance information and the luminance signal are combined, so that a high-quality color image can be captured even in the dark.

Figure 12:
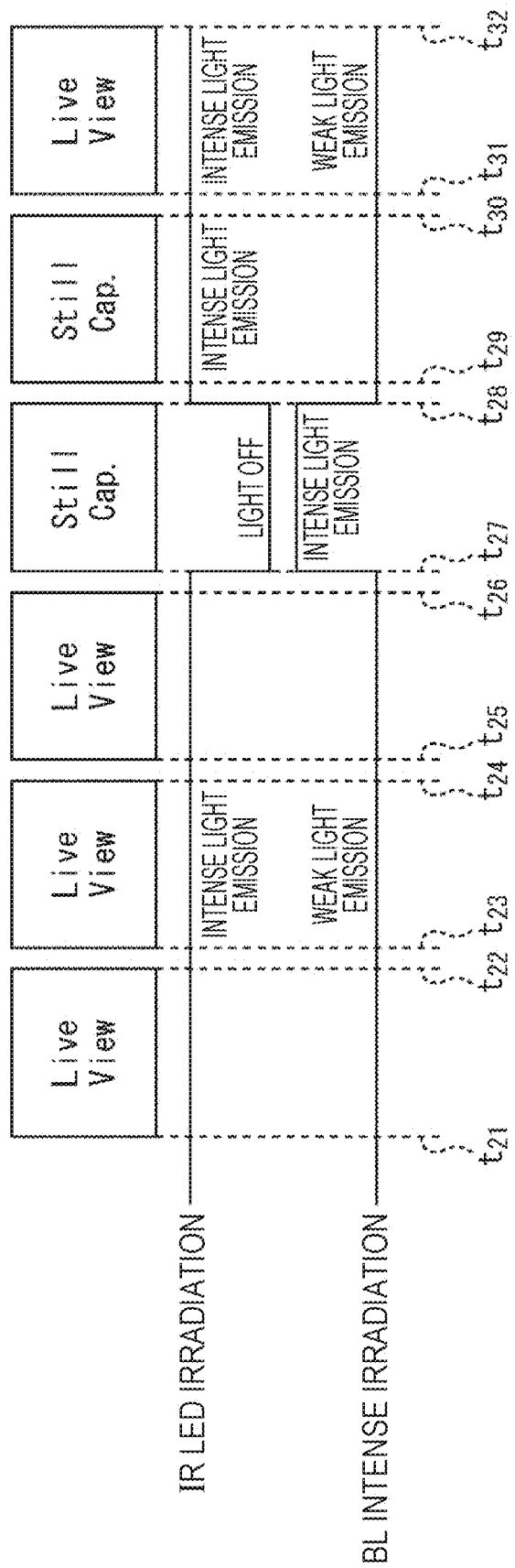
FIG. 12 is a diagram for explaining the imaging process to be performed by the information processing device shown in FIG. 8.

Through the above process, the processing shown in FIG. 12 is performed, for example.

That is, in a case where an image is regarded as dark after the imaging unit 31 is activated, the processes in steps S62, S63, S60, and S61 are repeated until the shutter is pressed. As indicated by times t21 through t26, a live view image is captured, the infrared light emitting unit 32 emits infrared light, the backlight of the display unit 33 emits weak light, and the display unit 33 continuously displays a live view image during the period from time t21 to time t22, the period from time t23 to time t24, and the period from time t25 to time t26.

In this case, if the shutter button is determined to have been operated as the operation input unit 33a has been operated, the series of processes in step S55 through S59 are carried out, so that the infrared light emitting unit 32 is turned off, the backlight of the display unit 33 emits intense light, a still image is captured by the imaging unit 31, and a visible light image is captured in the period from time t27 to time t28. In the period from time t28 to t30, the infrared light emitting unit 32 is made to emit intense light, the backlight of the display unit 33 emits weak light, a still image is captured by the imaging unit 31, and an infrared light image is captured. The visible light image and the infrared light image are then combined, so that a clear still image can be captured.

Through the above process, the backlight of the display unit 33 emits light like a strobe light when the operation input unit 33a serving as the shutter button is operated. Thus, the imaging unit 31 captures a visible light image, and then captures an infrared light image with infrared light. The visible light image and the infrared light image are then combined, so that a high-quality color image having a high SNR can be captured even in the dark.

4. Example Applications in the Third Embodiment

In the example described above, a visible light image and an infrared light image are captured and combined only when the operation input unit 33a serving as the shutter button is operated. However, a live view image may also be processed in a similar manner, so that the live view image is turned into a color image.

Figure 13:
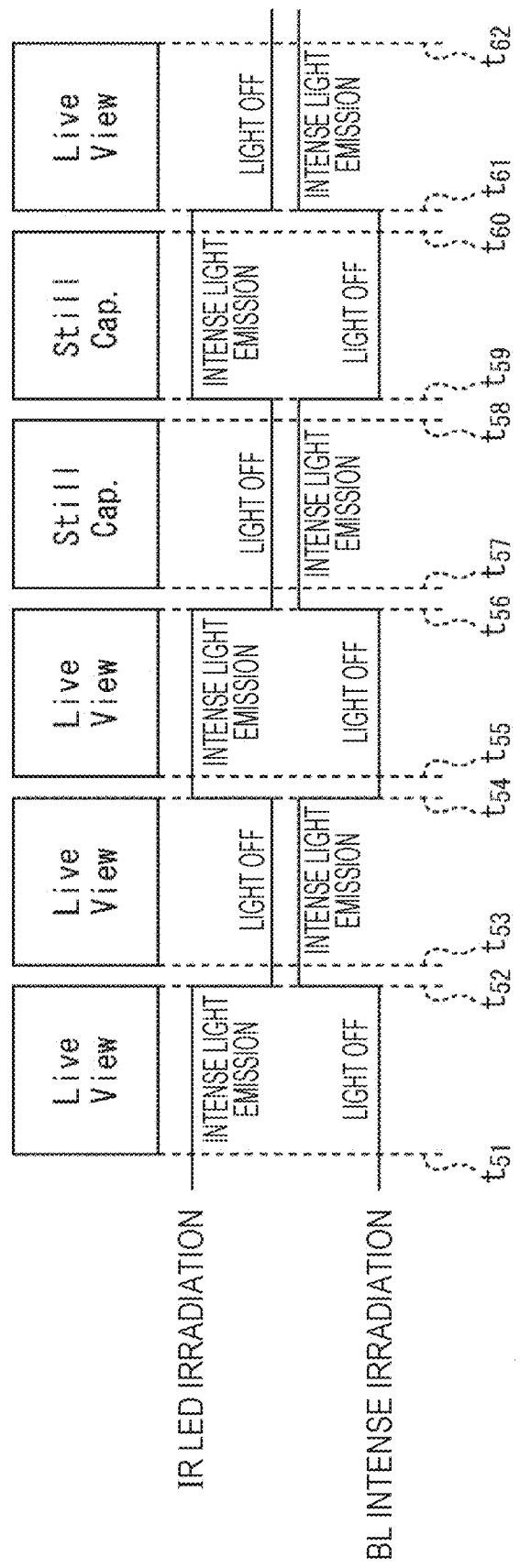
FIG. 13 is a diagram for explaining an example application of the imaging process to be performed by the information processing device shown in FIG. 8.

Specifically, as shown in FIG. 13, in a case where it is determined to be dark after the imaging unit 31 is activated, the following operation is repeated until the shutter is pressed: the infrared light emitting unit 32 emits intense light, the backlight of the display unit 33 is turned off, and an infrared light image is captured, as indicated by the period from time t51 to time t52; and the infrared light emitting unit 32 is turned off, the backlight of the display unit 33 emits intense light, and a visible light image is captured, as indicated by the period from time t52 to time t54. Then, after that, the infrared light image and the visible light image are combined, so that a color live view image is displayed.

Therefore, this operation is repeated until the shutter button is pressed. In this manner, live view images can also be displayed as color images.

In FIG. 13, at time t57, the shutter button is determined to have been operated as the operation input unit 33a has been operated. The series of processes in step S55 through S59 are then carried out, so that the infrared light emitting unit 32 is turned off, the backlight of the display unit 33 emits intense light, a still image is captured by the imaging unit 31, and a visible light image is captured in the period from time t57 to time t58. In the period from time t58 to t60, the infrared light emitting unit 32 is made to emit intense light, the backlight of the display unit 33 is turned off, a still image is captured by the imaging unit 31, and an infrared light image is captured. The visible light image and the infrared light image are then combined, so that a clear still image can be captured.

In the above process, regardless of whether the operation input unit 33a serving as the shutter button has been operated, a process of causing the infrared light emitting unit 32 to emit light and turning off the backlight of the display unit 33, and a process of turning off the infrared light emitting unit 32 and causing the backlight of the display unit 33 to emit light are repeated alternately among frames. An infrared light image and a visible light image that are alternately required are then combined, so that a color still image can be captured while a color live view image is displayed.

It should be noted that this example application can be realized with the information processing device 11 shown in FIG. 8, and therefore, the configuration thereof is not explained herein. Further, in the process in this case, the processing in steps S53 through S59 in the flowchart shown in FIG. 10 is repeated so that a live view image in the dark can be captured and displayed. Therefore, explanation of this process is not made herein. However, a live view image is an image that has relatively low resolution and a relatively low frame rate.

5. Variations of the Imaging Unit, the Infrared Light Emitting Unit, and the White Light Emitting Unit Various arrangement variations are possible for the imaging unit 31, the infrared light emitting unit 32, and the white light emitting unit 71.

Figure 14:
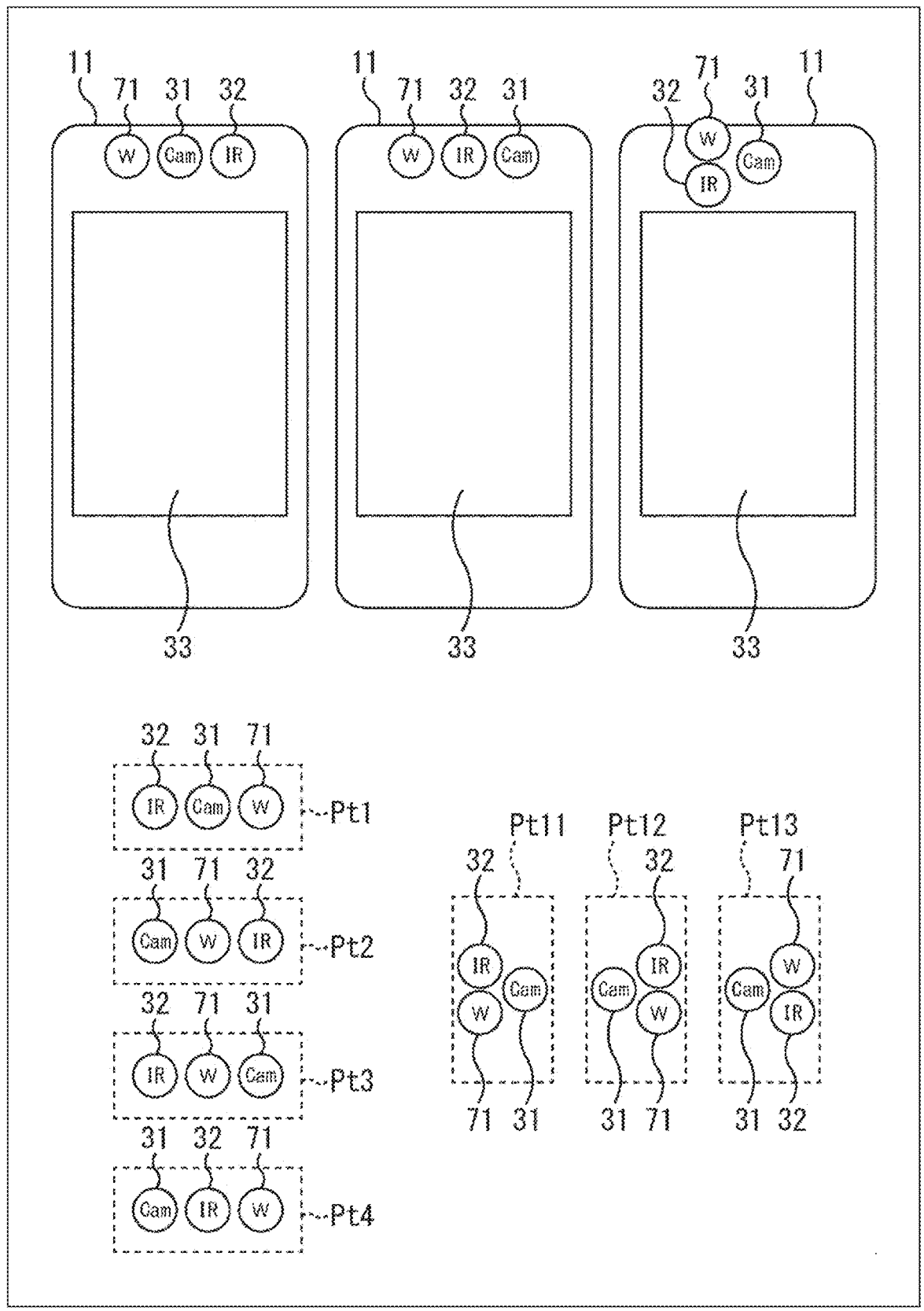
FIG. 14 is a diagram for explaining variations of arrangement patterns for the imaging unit, the infrared light emitting unit, and the white light emitting unit of the information processing device shown in FIG. 1.

For example, as shown in the upper left portion of FIG. 14, the white light emitting unit 71, the imaging unit 31, and the infrared light emitting unit 32 may be arranged in this order from the left in the drawing. As shown in the upper central portion of FIG. 14, the white light emitting unit 71, the infrared light emitting unit 32, and the imaging unit 31 may also be arranged in this order.

Also, as shown in an arrangement example Pt1, the infrared light emitting unit 32, the imaging unit 31, and the white light emitting unit 71 may be arranged in this order. As shown in an arrangement example Pt2, the imaging unit 31, the white light emitting unit 71, and the infrared light emitting unit 32 may be arranged in this order. As shown in an arrangement example Pt3, the infrared light emitting unit 32, the white light emitting unit 71, and the imaging unit 31 may be arranged in this order. As shown in an arrangement example Pt4, the imaging unit 31, the infrared light emitting unit 32, and the white light emitting unit 71 may be arranged in this order.

Further, as shown in the upper right portion of FIG. 14, the infrared light emitting unit 32 may be provided immediately below the white light emitting unit 71, and the imaging unit 31 may be provided to the right at an intermediate position between the white light emitting unit 71 and the infrared light emitting unit 32 in the vertical direction.

Likewise, as shown in an arrangement example Pt11, the white light emitting unit 71 may be provided immediately below the infrared light emitting unit 32, and the imaging unit 31 may be provided to the right at an intermediate position between the infrared light emitting unit 32 and the white light emitting unit 71 in the vertical direction. Also, as shown in an arrangement example Pt12, the imaging unit 31 may be provided to the left.

Further, as shown in an arrangement example Pt13, the infrared light emitting unit 32 and the white light emitting unit 71 in the arrangement example Pt12 may switch positions with each other in the vertical direction.

Figure 15:
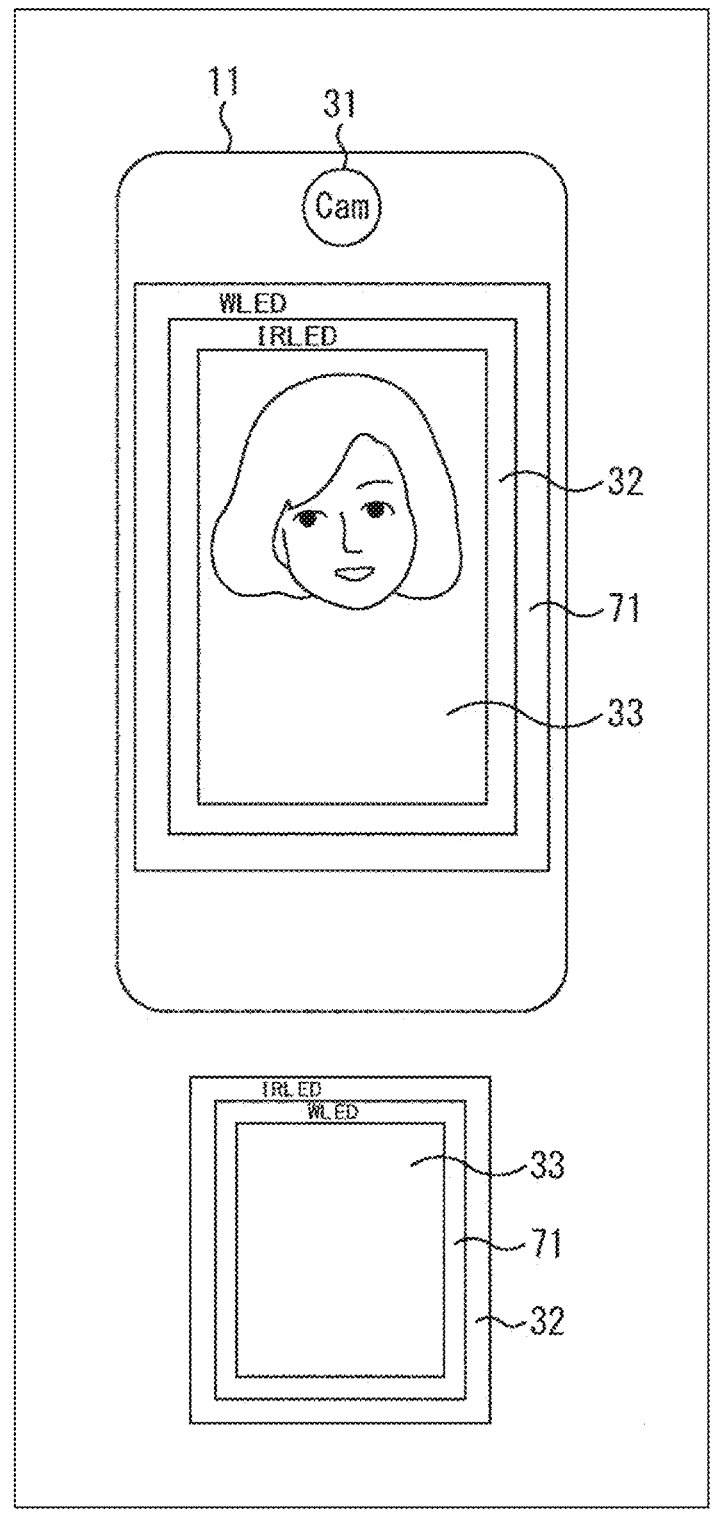
FIG. 15 is a diagram for explaining a variation of an arrangement pattern for the imaging unit, the infrared light emitting unit, and the white light emitting unit of the information processing device shown in FIG. 1.

Alternatively, as shown in the upper portion of FIG. 15, the infrared light emitting unit 32 may be formed in the shape of a frame surrounding the display unit 33, and the white light emitting unit 71 may be further provided in the shape of a frame surrounding the infrared light emitting unit 32.

Further, as shown in the lower portion of FIG. 15, the white light emitting unit 71 may be formed in the shape of a frame surrounding the display unit 33, and the infrared light emitting unit 32 may be further provided in the shape of a frame surrounding the white light emitting unit 71.

6. Example Applications

Examples Where Processes Are Carried Out by Software

While the above described series of processes can be performed by hardware, those processes can also be performed by software. In a case where the series of processes are performed by software, the program that forms the software may be installed in a computer incorporated into special-purpose hardware, or may be installed from a recording medium into a general-purpose personal computer or the like that can execute various kinds of functions by installing various kinds of programs, for example.

Figure 16:
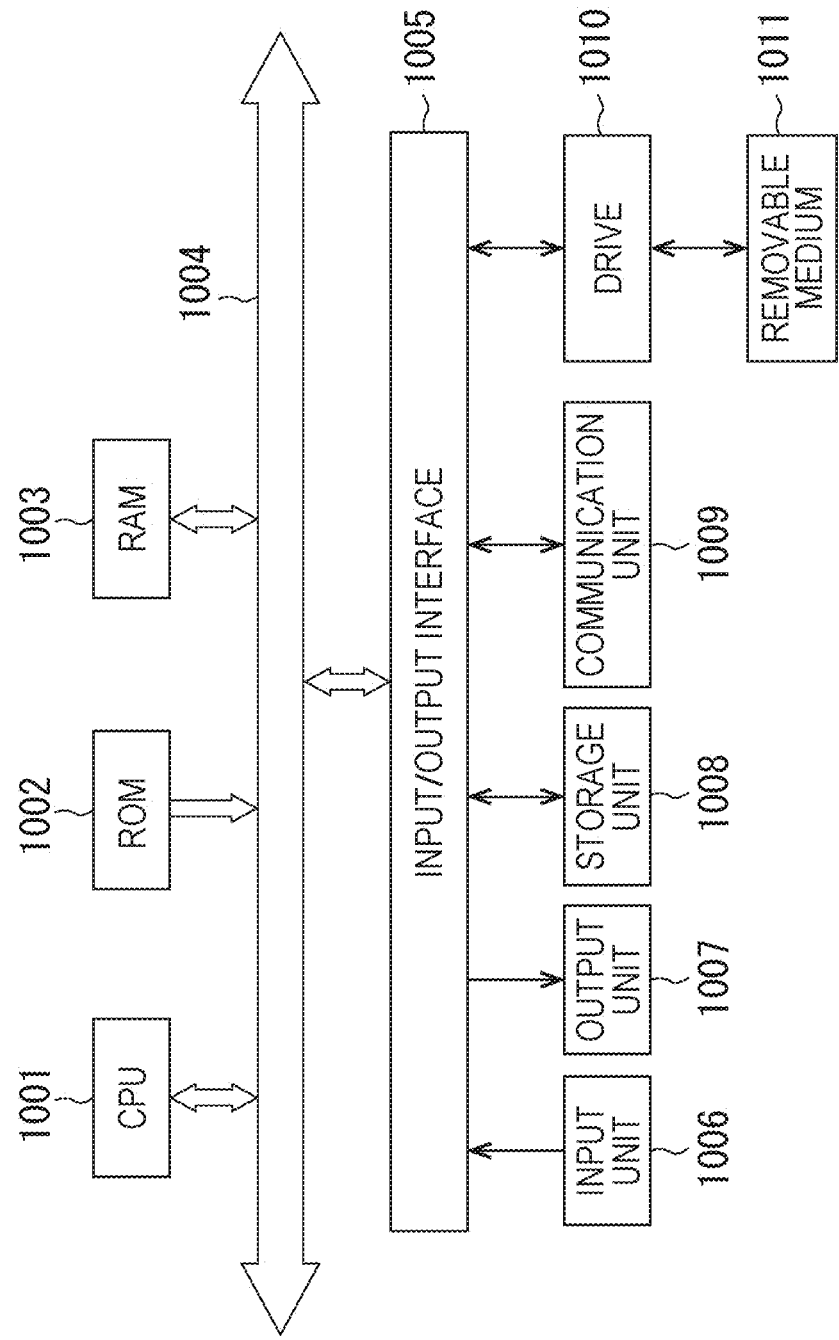
FIG. 16 is a diagram for explaining an example configuration of a general-purpose personal computer.

FIG. 16 shows an example configuration of a general-purpose personal computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005: the input unit 1006 is formed with an input device such as a keyboard or a mouse through which a user inputs an operation command; the output unit 1007 outputs an image of a process operating screen or a processing result to a display device; the storage unit 1008 is formed with a hard disk drive or the like that stores programs and various kinds of data; and the communication unit 1009 is formed with a local area network (LAN) adapter or the like, and performs a communication process via a network that is typically the Internet. A drive 1010 is also connected to the input/output interface 1005. The drive 1010 performs data reading and writing on a removable medium 1011 that is a magnetic disk (such as a flexible disk), an optical disk (such a compact disc-read only memory (CD-ROM) or a digital versatile disc (DVD)), a magnetooptical disk (such as Mini Disc (MD)), a semiconductor memory, or the like.

The CPU 1001 performs various processes in accordance with a program that is stored in the ROM 1002, or a program that is read from the removable medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) may be recorded on the removable medium 1011 and the like as a package medium to be provided, for example. Alternatively, the program can be provided via a wired or wireless transmission medium, such as a local area network, the Internet, or digital satellite broadcasting.

In the computer, the program can be installed into the storage unit 1008 via the input/output interface 1005 when the removable medium 1011 is mounted on the drive 1010. Also, the program may be received by the communication unit 1009 via a wired or wireless transmission medium, and be installed into the storage unit 1008. Alternatively, the program may be installed beforehand into the ROM 1002 or the storage unit 1008.

It should be noted that the program to be executed by the computer may be a program for performing processes in chronological order in accordance with the sequence described in the present specification, or may be a program for performing processes in parallel or performing a process when necessary, such as when there is a call.

Also, in this specification, a system means an assembly of components (devices, modules (parts), and the like), and not all the components need to be provided in the same housing. In view of this, a plurality of devices that are housed in different housings and are connected to one another via a network form a system, and one device having a plurality of modules housed in one housing is also a system.

It should be noted that embodiments of the present disclosure are not limited to the above described embodiments, and various modifications may be made to the embodiments without departing from the scope of the present disclosure.

For example, the present disclosure can be embodied in a cloud computing configuration in which one function is shared among devices via a network, and processing is performed by the plurality of devices cooperating with one another.

Also, the respective steps described with reference to the above described flowcharts can be carried out by one device or can be shared among a plurality of devices.

Further, in a case where more than one process is included in one step, the plurality of processes included in the step can be performed by one device or can be shared among a plurality of devices.

It should be noted that the present disclosure may also be embodied in the configurations described below.

<1>
An information processing device including:
an imaging unit that captures an infrared light image and a visible light image;
a white light emitting unit that emits white light; and
an infrared light emitting unit that emits infrared light, in which, when the white light emitting unit emits white light while the infrared light emitting unit does not emit infrared light, the imaging unit captures the visible light image.

<2>
The information processing device according to <1>, further including
a combining unit that combines the infrared light image and the visible light image,
in which,
when the white light emitting unit emits white light while the infrared light emitting unit does not emit infrared light, the imaging unit captures the visible light image, and
when the white light emitting unit does not emit white light or emits weak light while the infrared light emitting unit emits infrared light before or after the imaging unit captures the visible light image, the imaging unit captures the infrared light image.

<3>
The information processing device according to <2>, in which the combining unit includes:
a separation unit that separates the visible light image into a luminance signal and a chrominance signal; and
an infrared-light chrominance combining unit that combines a pixel signal of the infrared light image with the chrominance signal separated by the separation unit, the pixel signal of the infrared light image being regarded as the luminance signal.

<4>
The information processing device according to <3>, in which
the combining unit further includes a noise removal unit that removes noise from the visible light image, and
the separation unit separates the visible light image, from which noise has been removed by the noise removal unit, into the luminance signal and the chrominance signal.

<5>
The information processing device according to <3>, in which
the combining unit further includes a signal level correction unit that corrects a signal level of the pixel signal of the infrared light image, using the luminance signal separated by the separation unit, and
the infrared-light chrominance combining unit combines the pixel signal of the infrared light image having the signal level corrected by the signal level correction unit with the chrominance signal separated by the separation unit, the pixel signal having the corrected signal level being regarded as the luminance signal.

<6>
The information processing device according to <2>, in which, in a case where a still image capturing instruction is issued,
when the white light emitting unit emits white light while the infrared light emitting unit does not emit infrared light, the imaging unit captures the visible light image, and
when the white light emitting unit does not emit white light or emits weak light while the infrared light emitting unit emits infrared light before or after the imaging unit captures the visible light image, the imaging unit captures the infrared light image.

<7>
The information processing device according to <2>, in which, in a case where a live view image is to be captured,
when the white light emitting unit emits white light while the infrared light emitting unit does not emit infrared light, the imaging unit captures the visible light image, and when the white light emitting unit does not emit white light or emits weak light while the infrared light emitting unit emits infrared light before or after the imaging unit captures the visible light image, the imaging unit captures the infrared light image.

<8>

The information processing device according to <1>, in which the white light emitting unit is a light emitting diode (LED).

<9>

The information processing device according to <1>, further including a display unit that displays an image captured by the imaging unit, in which the white light emitting unit is a backlight of the display unit.

<10>

The information processing device according to <1>, in which the imaging unit, the infrared light emitting unit, and the white light emitting unit are disposed on the same face of a main body.

<11>

The information processing device according to <10>, in which the imaging unit, the infrared light emitting unit, and the white light emitting unit are disposed on a surface of the main body.

<12>

An information processing method implemented in an information processing device that includes:

an imaging unit that captures an infrared light image and a visible light image;

a white light emitting unit that emits white light; and an infrared light emitting unit that emits infrared light, in which, when the white light emitting unit emits white light while the infrared light emitting unit does not emit infrared light, the imaging unit captures the visible light image.

<13>

A program for causing a computer to function as:

an imaging unit that captures an infrared light image and a visible light image;

a white light emitting unit that emits white light; and an infrared light emitting unit that emits infrared light, in which, when the white light emitting unit emits white light while the infrared light emitting unit does not emit infrared light, the imaging unit captures the visible light image.

REFERENCE SIGNS LIST

11 Information processing device
31 Imaging unit
32 Infrared light emitting unit
33 Display unit
33a Operation input unit
51 Control unit
52 Image processing unit
71 White light emitting unit
91 Image combining unit
92 Buffer
111 Noise removal unit
112 Luminance chrominance extraction unit
113 Signal level correction unit
114 Infrared-light chrominance combining unit

The invention claimed is:

1. An information processing device comprising:
a display unit configured to display a captured image;
a plurality of light emitters, the light emitters including a white light emitter that emits white light and an infrared light emitter that emits infrared light;
an imaging sensor that captures an infrared light image produced using the infrared light, and that captures a visible light image produced using the white light; and
a controller that controls operation of the white light emitter and the infrared light emitter, wherein:
when an ambient illuminance is determined to be dark, and without an indication that a shutter activation has been inputted for a recording operation, the controller controls the light emitters such that imaging sensor captures the infrared light image, and controls the display unit to display the captured image as a live view of the infrared light image,
when the ambient illuminance is determined to be dark, and upon an indication that the shutter activation has been inputted, the controller controls the white light emitter to emit white light and controls the infrared light emitter to stop emitting infrared light, in order for the imaging sensor to capture the visible light image for the recording operation, and
when capturing of the visible light image for the recording operation has finished, the controller controls the light emitters such that the imaging sensor captures the infrared light image, and controls the display unit to resume displaying the live view of the infrared light image.

2. The information processing device according to claim 1, further comprising
an image combiner that combines the infrared light image and the visible light image,
wherein, the controller performs control operations such that
the visible light image is captured when the white light emitter emits white light while the infrared light emitter does not emit infrared light, and
the infrared light image is captured when the white light emitter does not emit white light or emits weak light while the infrared light emitter emits infrared light before or after the imaging sensor captures the visible light image.

3. The information processing device according to claim 2, wherein the combiner includes:
a separator that separates the visible light image into a luminance signal and a chrominance signal, and
an infrared-light chrominance combiner that combines a pixel signal of the infrared light image with the chrominance signal separated by the separator, the pixel signal of the infrared light image being regarded as the luminance signal.

4. The information processing device according to claim 3, wherein
the combiner further includes a noise filter that removes noise from the visible light image, and
the separator separates the visible light image, from which noise has been removed by the noise filter, into the luminance signal and the chrominance signal.

5. The information processing device according to claim 3, wherein
the combiner further includes a signal level corrector that corrects a signal level of the pixel signal of the infrared light image, using the luminance signal separated by the separator, and
the infrared-light chrominance combiner combines the pixel signal of the infrared light image having the signal level corrected by the signal level corrector with the chrominance signal separated by the separator, the pixel signal having the corrected signal level being regarded as the luminance signal.

6. The information processing device according to claim 2, wherein, in a case where a still image capturing instruction is issued, the imaging sensor captures the visible light image when the white light emitter emits white light while the infrared light emitter does not emit infrared light, and the imaging sensor captures the infrared light image when the white light emitter does not emit white light or emits weak light while the infrared light emitter emits infrared light before or after the imaging sensor captures the visible light image.

7. The information processing device according to claim 2, wherein, in a case where the live view image is to be displayed by the display unit, the imaging sensor captures the visible light image when the white light emitter emits white light while the infrared light emitter does not emit infrared light, and the imaging sensor captures the infrared light image when the white light emitter does not emit white light or emits weak light while the infrared light emitter emits infrared light before or after the imaging sensor captures the visible light image.

8. The information processing device according to claim 1, wherein the white light emitter is a light emission diode (LED).

9. The information processing device according to claim 1, wherein the white light emitter is a backlight of the display unit.

10. The information processing device according to claim 1, wherein each of the imaging sensor, the infrared light emitter, and the white light emitter is disposed on a face of a main body.

11. The information processing device according to claim 10, wherein the imaging sensor, the infrared light emitter, and the white light emitter are disposed on a same surface of the main body.

12. An information processing method implemented in an information processing device, the information processing device including: a display unit that displays a captured image, a plurality of light emitters that include a white light emitter that emits white light and an infrared light emitter that emits infrared light, and an imaging sensor that captures an infrared light image produced using the infrared light, and that captures a visible light image produced using the white light, the method comprising:

when an ambient illuminance is determined to be dark, and without an indication that a shutter activation has been inputted for a recording operation, controlling the light emitters such that imaging sensor captures the infrared light image, and controlling the display unit to display the captured image as a live view of the infrared light image;

when the ambient illuminance is determined to be dark, and upon an indication that the shutter activation has been inputted, controlling the white light emitter to emit white light and controlling the infrared light emitter to stop emitting infrared light, in order for the imaging sensor to capture the visible light image for the recording operation; and when capturing of the visible light image for the recording operation has finished, controlling the light emitters such that imaging sensor captures the infrared light image, and controlling the display unit to resume displaying the live view of the infrared light image.

13. A non-transitory computer-readable storage medium storing a program that when executed by a computer of an information processing device causes the computer to perform an information processing method, the information processing device including: a display unit that displays a captured image, a plurality of light emitters including a white light emitter that emits white light and an infrared light emitter that emits infrared light, and an imaging sensor that captures an infrared light image produced using the infrared light, and that captures a visible light image produced using the white light, the method comprising:

when an ambient illuminance is determined to be dark, and without an indication that a shutter activation has been inputted for a recording operation, controlling the light emitters such that imaging sensor captures the infrared light image, and controlling the display unit to display the captured image as a live view of the infrared light image;

when the ambient illuminance is determined to be dark, and upon an indication that the shutter activation has been inputted, controlling the white light emitter to emit white light and controlling the infrared light emitter to stop emitting infrared light, in order for the imaging sensor to capture the visible light image for the recording operation; and when capturing of the visible light image for the recording operation has finished, controlling the light emitters such that imaging sensor captures the infrared light image, and controlling the display unit to resume displaying the live view of the infrared light image.

* * * * *